United States Patent [19]
Byrnes et al.

[11] Patent Number: 5,372,479
[45] Date of Patent: Dec. 13, 1994

[54] FLEXBEAM FOR A HELICOPTER BEARINGLESS MAIN ROTOR ASSEMBLY

[75] Inventors: Francis E. Byrnes, White Plains, N.Y.; Timothy A. Krauss, Harwinton; David N. Schmaling, Oxford, both of Conn.

[73] Assignee: United Technologies Corporation, Hartford, Conn.

[21] Appl. No.: 70,573

[22] Filed: Jun. 2, 1993

[51] Int. Cl.[5] .............................................. B64C 27/33
[52] U.S. Cl. .................................. 416/134 A; 416/230
[58] Field of Search ................... 416/134 A, 138, 141, 416/230

[56] References Cited

U.S. PATENT DOCUMENTS

| | | | |
|---|---|---|---|
| 4,037,988 | 7/1977 | Laird | 416/134 A |
| 4,332,525 | 6/1982 | Cheney, Jr. | 416/134 A |
| 4,427,340 | 1/1984 | Metzger et al. | 416/134 A |
| 4,648,800 | 3/1987 | Fradenburgh et al. | 416/134 A |
| 4,746,272 | 5/1988 | Noehren et al. | 416/134 A |
| 4,892,461 | 1/1990 | Matsumoto et al. | 416/134 A |
| 4,898,515 | 2/1990 | Beno et al. | 416/134 A |
| 5,091,029 | 2/1992 | Davis et al. | 416/134 A |
| 5,096,380 | 3/1992 | Byrnes et al. | 416/134 A |
| 5,263,821 | 11/1993 | Noehren et al. | 416/134 A |

Primary Examiner—Edward K. Look
Assistant Examiner—James A. Larson
Attorney, Agent, or Firm—Terrance J. Radke

[57] ABSTRACT

A flexbeam for a soft inplane bearingless main rotor assembly has six spanwise regions: a hub attachment region; a first tapered region; a second tapered region; a pitch region; a tapered outboard transition region; and a main rotor blade, torque tube attachment region. One described embodiment of the flexbeam is fabricated from continuous unidirectional fiberglass plies having a 0° fiber orientation, unidirectional fiberglass plies of varying lengths having a 0° fiber orientation, and graphite cross plies having ±45° fiber orientations. The pitch region is formed solely by the continuous fiberglass plies which define a rectangular cross section therefor. The second tapered region is formed solely by the continuous fiberglass plies and the fiberglass plies of varying lengths. The ends of the fiberglass plies terminate in a distributed arrangement in the second tapered region to define the taper thereof. The remaining regions of the flexbeam are formed by interleaved combinations of the continuous fiberglass plies, the fiberglass plies of varying length, and the graphite cross plies of varying length. Ends of the graphite cross plies terminate in a distributed arrangement in the first tapered region to partially define the taper thereof. Ends of the fiberglass plies and the graphite cross plies terminate in a distributed arrangement in the tapered outboard transition region to define the taper thereof. The distributed arrangements of ply endings cause kick loads in the flexbeam to be distributed relatively uniformly into the ply buildups.

20 Claims, 3 Drawing Sheets

FLEXBEAM FOR A HELICOPTER BEARINGLESS MAIN ROTOR ASSEMBLY

DESCRIPTION

1. Technical Field

The present invention relates to bearingless main rotor assemblies for helicopters, and more particularly, to a flexbeam for a helicopter bearingless main rotor assembly.

2. Background of the Invention

Helicopter main rotor assemblies are subjected to a variety of operational forces—aerodynamic, inertial, and centrifugal. The hub of a helicopter main rotor assembly must have sufficient mechanical strength to react such forces, and yet be compliant enough to allow each main rotor blade some independent motion to relieve the stresses therein. To accommodate these conflicting conditions, prior art main rotor assemblies have been fabricated from high strength metallic materials and incorporated hinges and/or bearings to facilitate independent motion of each main rotor blade. Such prior art main rotor assemblies have been mechanically complex, difficult to maintain, and costly to operate.

While some improvements in service requirements, reliability, and cost have been achieved by the use of elastomeric bearings in helicopter main rotor assemblies, the focus recently has been on "bearingless" main rotor (BMR) assemblies. BMR assemblies incorporate flexible structural members, e.g., flexbeams, that are designed to transmit and/or react bending loads (flapwise and chordwise), axial loads (centrifugal), and torsional loads (pitch). Each flexbeam is attached directly to the hub of the BMR assembly to provide a "hingeless" configuration that eliminates the need for rolling-element or elastomeric bearings (flap, drag) at the hub attachment point. In designing a flexbeam for a BMR assembly, several conflicting design constraints must be accommodated.

First, the attachment joints of the flexbeam must be structurally rigid to transmit blade loads to the BMR hub assembly. The flexbeam must include a flap hinge portion to provide a bending capability to react flapwise loading. Concomitantly, the flap hinge portion of the flexbeam must be structurally configured to accommodate the high bending strains resulting from high maneuver rotor loading and to react blade centrifugal loads. Third, the flexbeam must include a pitch section with reduced torsional stiffness to facilitate collective and cyclic pitch control, i.e., high elastic torsional displacements, of the main rotor blade. Concomitantly, the pitch section must accommodate the high torsional strains resulting from cyclic/collective pitch inputs and must provide sufficient strength to react blade centrifugal loads and to prevent torsional buckling of the flexbeam under chordwise loading.

A primary benefit of the flexbeam is the segregation of flapwise loads from torsional loads, thereby permitting increased flapwise displacement while reducing hub moment offset. The flight characteristics and capabilities of a helicopter are determined in substantial part by the design of the main rotor assembly, and, more specifically, by the distance between the main rotor hub assembly and the equivalent flap hinge, i.e., hub moment constant or hinge offset (expressed as a percentage of rotor radius). As hinge offset increases (the further the "hinge" is from the hub center, the larger the hub moment constant), blade loads are more effectively transmitted to the helicopter via the main rotor hub assembly, i.e., control power and agility increase with greater hinge offset. Vibration and gust sensitivity also increase with hinge offset, however, and helicopter pitch stability is likewise progressively degraded with increasing hinge offset. Hinge offset is, therefore, a compromise between agility and high-speed handling. It is difficult to design a hub assembly for a BMR assembly that is flexible enough to provide a low hinge offset, yet strong enough to carry the high centrifugal loads (as much as thirty-five tons).

The design of composite flexbeams for BMR assemblies is one of the most challenging problems confronting helicopter design engineers. The composite flexbeam must be designed to meet bending strain, shear stress, buckling, and frequency limitations for critical loading conditions, i.e., flapwise, chordwise, torsional, and centrifugal loads, that result from design constraints such as hub moment stiffness, vibratory chord moment, and pitch angle. The critical loading conditions include start up and shutdown, which generate low-cycle, high-strain flapwise and chordwise loads, and forward flight conditions, which can generate high-cycle, high-strain loads such as 1 cycle/rev oscillatory flap and torsional displacements.

In general, a certain minimum cross section is necessary to transmit the main rotor blade centrifugal loads. Conversely, however, the thickness of the given composite material(s) comprising the flexbeam must be minimized to ensure that maximum allowable torsion shear strain limits are not exceeded. Flapwise and chordwise loads require additional material in the flexbeam to accommodate bending stresses. Such additional material, however, increases flexbeam stiffness, causing increased hinge offset. For a soft inplane rotor design, the chordwise flexbeam stiffness is governed by the need to place the rotor chordwise frequency at about 0.7 cycle/rev. If the flexbeam is too compliant in chordwise flexibility, the BMR assembly is more susceptible to aeromechanical and structural instability. If the flexbeam is too stiff, however, chordwise loads will increase because of 1 cycle/rev resonance. The torsional stiffness of the pitch section of the flexbeam should be minimized to keep pitch actuator power requirements to a minimum. In contradistinction, however, the torsional stiffness of the pitch section should be high to provide buckling stability under edgewise loading.

While helicopter design engineers struggle to accommodate the foregoing design constraints in designing an optimal flexbeam for a BMR assembly, attention must also be paid to manufacturing considerations. The flexbeam design should be relatively uncomplicated from a manufacturing standpoint. The composite flexbeam must be designed to avoid unsuitable cross-sectional transitionings and abrupt cross-sectional changes. It is known in the art to design flexbeams with upper and/or lower ribs to provide the necessary design strength. However, the manufacture of a composite flexbeam incorporating ribbed structure(s) is a relatively complex fabrication procedure. Prior art flexbeams having pitch sections of rectangular configuration that accommodated centrifugal loads and precluded torsional bucking were generally too stiff torsionally to accommodate the required torsional pitch deflections.

A need exists to provide an optimized flexbeam for a soft inplane BFZR assembly. The flexbeam should be design optimized to accommodate the bending strain, shear stress, buckling, and frequency requirements of the BMR assembly while concomitantly being simple to manufacture. The flexbeam should have a rectangular cross section to minimize manufacturing risk while maximizing torsional efficiency.

SUMMARY OF THE INVENTION

One object of the present invention is to provide a flexbeam for a simple, low-cost, soft inplane bearingless main rotor (BMR) assembly for a helicopter.

Another object of the present invention is to provide a flexbeam that is structurally configured to accommodate the bending strain, shear stress, buckling, and frequency requirements of the soft inplane BMR assembly.

Still another object of the present invention is to provide a flexbeam having a rectangular cross section to minimize manufacturing risk and to maximize torsional efficiency.

Yet another object of the present invention is to provide a flexbeam that has excellent ballistic tolerance characteristics.

Still a further object of the present invention is to provide a flexbeam structurally configured to provide a pitch deflection capability in the flexural portion thereof such that the twist rate of the flexbeam is minimized.

Yet a further object of the present invention is to provide a flexbeam formed from composite ply laminates having distributed ply drop-off arrangements in selected regions thereof such that the kick loads of the flexbeam are distributed into the ply build-up relatively uniformly rather than concentrated at a localized line of action.

These and other objects of the present invention are achieved by a flexbeam according to the present invention for a soft inplane BMR assembly. The flexbeam comprises six spanwise regions: a hub attachment region; a first tapered region; a second tapered region; a pitch region; a tapered outboard transition region: and a main rotor blade, torque tube (BT) attachment region. Each region is structurally configured to perform a specific primary function and is coupled to adjacent regions and their functions. In particular, the first and second tapered regions define a tapered flexural region that is structurally configured to provide a pitch deflection capability, in addition to accommodating flapwise loading, such that the pitch region of the flexbeam has a relatively low twist rate.

The flexbeam is comprised of an admixture of composite plies embodying specific characteristics. More specifically, the flexbeam is fabricated from composite plies having good ballistic tolerance characteristics and from composite plies having a high stiffness-to-weight ratio. One preferred embodiment of the flexbeam according to the present invention comprises continuous unidirectional fiberglass plies having fiber orientations of 0°, unidirectional fiberglass plies of varying lengths having fiber orientations of 0°, and graphite cross plies of varying lengths having fiber orientations of ±45°.

The hub attachment region of the described embodiment of the flexbeam comprises a substantially 50/50 admixture of the continuous unidirectional fiberglass plies and the unidirectional fiberglass plies of varying lengths and the graphite cross plies of varying lengths in interleaved combination. The interleaved combination of plies forming the hub attachment region extend outwardly therefrom to form the first tapered region. The ends of the graphite cross plies terminate in a distributed arrangement in the first tapered region to partially define the taper thereof.

The second tapered region is comprised solely of the unidirectional fiberglass plies extending outwardly from the first tapered region. The ends of the unidirectional fiberglass plies of varying length terminate in a distributed arrangement in the second tapered region to define the taper thereof. The unidirectional fiberglass plies have a reduced torsional stiffness that provides a torsional deflection capability in the tapered flexural transition region. This torsional deflection capability in the tapered flexural transition region provides the pitch region of the flexbeam with a relatively low twist rate.

The pitch region is formed by the continuous unidirectional fiberglass plies extending outwardly from the second tapered region. The continuous unidirectional fiberglass plies define a constant rectangular cross section for the pitch region which has sufficient strength to transmit centrifugal loads and to prevent torsional buckling of the section.

The tapered outboard transition region is formed by the continuous unidirectional fiberglass plies extending outwardly from the pitch region and unidirectional fiberglass plies and graphite cross plies of varying lengths in interleaved combination. The ends of the unidirectional fiberglass plies and the graphite cross plies in combination define a distributed arrangement that defines the taper of the tapered outboard transition region. The interleaved combination of plies forming the tapered outboard transition region extend outwardly therefrom to form the BT attachment region.

The respective distributed arrangements of ply endings of the flexbeam according to the present invention results in non-additive kick loads in the ply buildups comprising the flexbeam. In consequence, there is no strength reduction in the flexbeam due to the terminated endings of the ply buildups.

BRIEF DESCRIPTION OF THE DRAWINGS

A more complete understanding of the present invention and the attendant features and advantages thereof may be had by reference to the following detailed description of the invention when considered in conjunction with the accompanying drawings wherein.

DETAILED DESCRIPTION OF PREFERRED EMBODIMENTS

Figure 1:
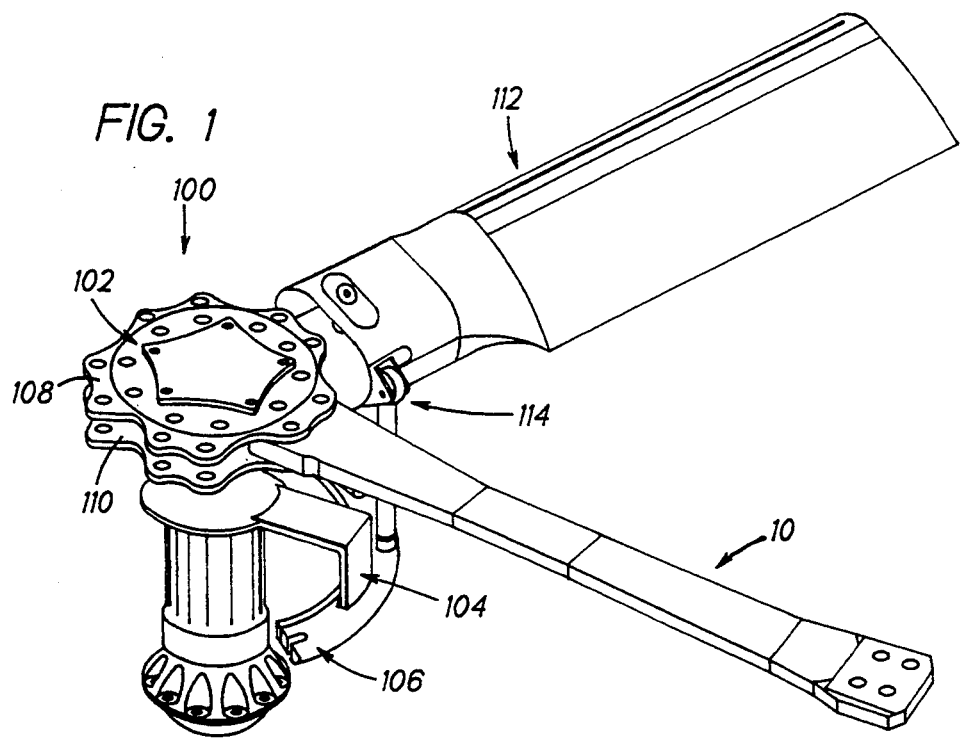
FIG. 1 is a perspective view of an exemplary bearingless main rotor hub assembly for a helicopter.
Figure 2:
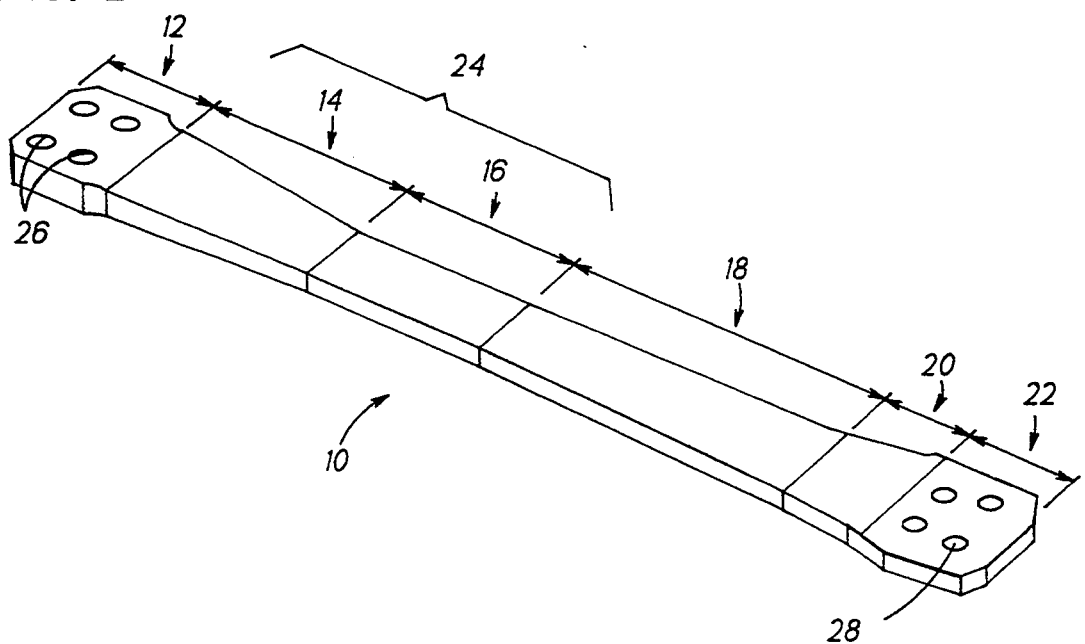
FIG. 2 is a perspective view of a flexbeam according to the present invention.

Referring now to the drawings wherein like reference characters identify corresponding or similar elements throughout the several views, FIGS. 1 and 2 illustrate a flexbeam 10 according to the present invention for a soft in-plane bearingless main rotor (BMR) assembly for a helicopter. An exemplary main rotor hub assembly 100 of a BMR assembly is depicted in FIG. 1.

The BMR hub assembly 100 comprises a main rotor quill shaft 102 for transmitting engine torque to the main rotor blades (not shown) of the BMR assembly, a rotating scissors 104 and a rotating swashplate 106. The BMR hub assembly 100 further includes upper and lower plates 108, 110 which form a clevis. Each flexbeam 10 is secured in combination with the BMR hub assembly 100 by means of bolted connections utilizing the upper and lower plates 108, 110.

Each flexbeam 10 according to the present invention is encased within a torque tube 112 which is mechanically coupled to the corresponding main rotor blade (inboard end thereof) and the flexbeam 10 (outboard end thereof). The torque tube 112 provides the means for coupling cyclic and/or collective pitch inputs to the main rotor blade which is accommodated by the twisting of the corresponding flexbeam 10. A pitch control rod 114 is mechanically connected to the inboard end of the torque tube 112, and pitch inputs are coupled to the main rotor blades by means of the rotating scissors 104, rotating swashplate 106, pitch control rods 114, and torque tubes 112, respectively.

The flexbeam 10 according to the present invention is illustrated in further detail in FIG. 2 and comprises six spanwise regions: a hub attachment region 12, a first tapered region 14, a second tapered region 16, a pitch region 18, a tapered outboard transition region 20, and a main rotor blade, torque tube (BT) attachment region 22. The first and second tapered regions 14, 16 define a tapered flexural transition region 24 of the flexbeam 10. The hub attachment region 12 includes apertures 26 for securing the flexbeam 10 in combination with the BMR hub assembly 100 (via the upper and lower plates 108, 110). The BT attachment region 22 includes apertures 28 for securing the flexbeam 10 in combination with the corresponding torque tube 112 and main rotor blade.

The flexbeam 10 according to the present invention is structurally optimized to simultaneously satisfy the bending strain, shear stress, buckling, and frequency constraints of a predefined BMR assembly (e.g., hub moment stiffness, pitch angle limits). The flexbeams 10 are configured to react the flapwise, chordwise, torsional, and centrifugal loads of the respective main rotor blades. Further, the flexbeams 10 are fabricated to accommodate the high bending strains resulting from high maneuver rotor loads and the high twisting strains due to cyclic and/or collective pitch inputs. Each region of the flexbeam 10 is structurally configured to perform a specific primary function, and, in addition, each region is coupled to the other regions and their functions.

The hub attachment region 12 is configured to accommodate securement of the flexbeam 10 in combination with the BMR hub assembly 100. Functionally, the hub attachment region 12 is primarily designed to transfer flexbeam moments into the BMR hub assembly 100. Chordwise bending moments and centrifugal forces are reacted through the bolted connections of the hub attachment region 12. Flapwise moments are reacted by: (i) differential bending loading of the bolted connection, which produces axial tension and compression in the upper and lower plates 108, 110; and (ii) bending stresses in the upper and lower plates 108, 110. The first tapered region 14 is structurally configured to achieve the effective flap hinge offset for the BMR hub assembly 100.

The second tapered region 16 provides the transition into the pitch region 18 and contributes to the tuning capability for the first lag frequency of the BMR assembly, e.g., about 0.7 cycle/rev. The tapered flexural transition region 24, and in particular the second tapered region 16 thereof, is structurally configured to react a portion of the elastic torsional displacements (induced pitch) of the flexbeam 10. The pitch region 18 is structurally configured to accommodate the major portion of the blade pitch displacement, i.e., torsional displacements due to pitch inputs, and also contributes to the first lag mode frequency tuning. The outboard transition region 20 provides the transition between the pitch region 18 and the BT attachment region 22. The BT attachment region 22 is configured to accommodate securement of the flexbeam 10 in combination with the corresponding torque tube 112 and main rotor blade. The centrifugal forces of the main rotor blade are reacted through the BT attachment region 22.

In order to provide a rectangular cross-sectional configuration that facilitates manufacture of the flexbeam 10, a pitch deflection capability is provided by the second tapered region 16 of the tapered flexural transition region 24, in addition to the pitch region 18. By enlarging the number of regions of the flexbeam 10 that accommodate a portion of the elastic torsional displacements thereof, a relatively low twist rate is achieved in the pitch region 18 of the flexbeam 10, allowing it to be structurally optimized, i.e., to be thick enough to preclude torsional buckling while still having acceptable torsional stress levels. The first tapered region 14 is configured to provide both torsional stiffness and flexural capability. The second tapered region 16 is configured to provide reduced torsional stiffness while concomitantly reacting the applied bending loads. The flexbeam 10 has a rectangular cross-sectional configuration that minimizes manufacturing risk while concomitantly maximizing torsional efficiency.

The flexbeam 10 according to the present invention is comprised of an admixture of composite plies (either prepregs or RTM) embodying specific characteristics, which are layed-up in a predetermined manner, as described in further detail hereinbelow, to provide the flexbeam 10 having the characteristics described hereinabove. A primary design constraint for the flexbeam 10 according to the present invention is ballistic survivability inasmuch as the flexbeam 10 is intended for use in the BMR assemblies of helicopters having military applications. This design constraint dictated the use of composite plies having good ballistic tolerance characteristics, e.g., good fracture, toughness, and failure modes. One such composite material possessing good ballistic tolerance characteristics is fiberglass. In addition to possessing good ballistic tolerance characteristics, fiberglass also possesses good strain allowables. Fiberglass, however, has a low stiffness-to-weight ratio. Graphite, in contrast, which possesses poor fracture, toughness, and failure modes, i.e., poor ballistic tolerance characteristics, possesses good stress allowables and has a high stiffness-to-weight ratio. Graphite plies provide the high torsional stiffness required for the hub attachment region 12, the first tapered region 14, the tapered outboard transition region 20, and the BT attachment region 22 of the flexbeam 10 according to the present invention.

The embodiment of the flexbeam 10 described herein was fabricated utilizing fiberglass, toughened epoxy composite plies and graphite, toughened epoxy composite plies. In particular, the fiberglass was a Ciba-Geighy 7376/S-2 fiberglass and the graphite was a 6376/graphite. The fiberglass plies are unidirectional plies having fibers with a 0° orientation (spanwise) and the graphite plies are cross plies having fibers with a ±45° orientation. While the flexbeam 10 embodiment described in the following paragraphs was fabricated from fiberglass and graphite plies of the type described hereinabove, one skilled in the art will appreciate that the flexbeam 10 may be fabricated from other types of fiberglass and/or graphite as well as other composite materials that possess characteristics comparable to the fiberglass and graphite materials described hereinabove.

Figures 3A, 3B:
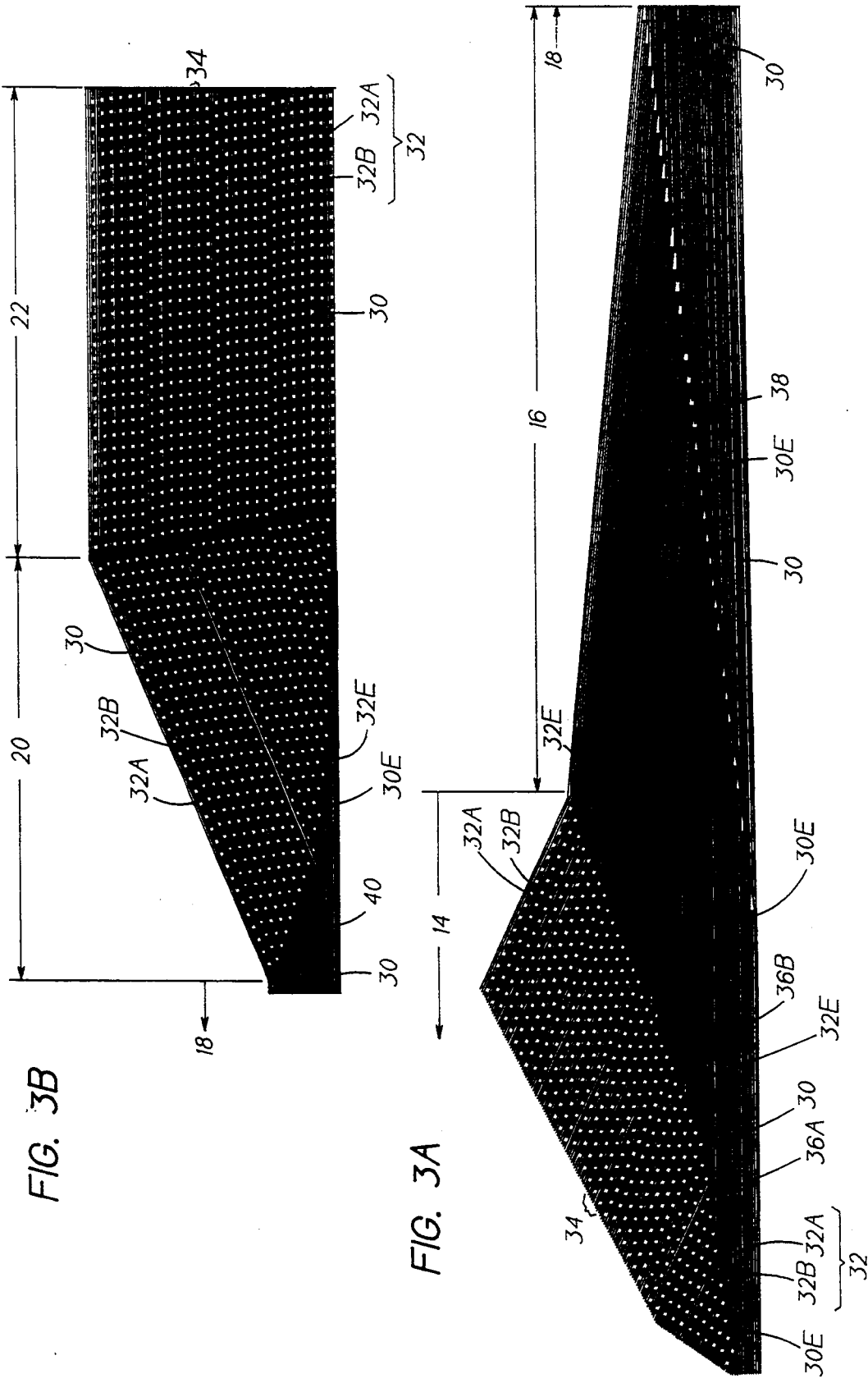
FIG. 3A is a partial cross-sectional view of the tapered flexural transition region of the flexbeam of FIG. 2.
FIG. 3B is a partial cross-sectional view of the outboard end of the flexbeam of FIG. 2.

The hub attachment region 12 of the flexbeam 10 comprises a substantially 50/50 admixture of unidirectional fiberglass plies 30 and ±45° graphite cross plies 32 (the plies 30, 32 are depicted in FIGS. 3A, 3B). The unidirectional fiberglass plies 30 and the ±45° graphite cross plies 32 are layed-up from the mold OML inwardly in interleaved combination to form the hub attachment region 12. The unidirectional fiberglass plies 30 and ±45° graphite cross plies 32 in interleaved combination provide high torsional stiffness and good flexural strength.

For the described embodiment of the flexbeam 10, the hub attachment region 12 comprises one hundred and seventy-six plies 30 of unidirectional fiberglass and one hundred and sixty-eight plies 32 of ±45° graphite. Starting at the outside surfaces of the hub attachment region 12, the cross-sectional ply distribution comprises repeating ply sequences 34 of two unidirectional fiberglass plies 30, a −45° graphite cross ply 32A, and a +45° graphite cross ply 32B (forty-two ply sequences 34 on each side of the flexbeam centerline), except at the centerline of the flexbeam 10 wherein eight unidirectional fiberglass plies 30 are layed-up in abutting combination.

The first tapered region 14 is formed by the interleaved combination of the unidirectional fiberglass plies 30 and ±45° graphite cross plies 32 extending outwardly from the hub attachment region 12. This combination of plies 30, 32 gives the first tapered region 14 both torsional stiffness and flexural capability.

Substantially all of the unidirectional fiberglass plies 30 comprising the hub attachment region 12 extend into and through the first tapered region 14. The innermost unidirectional fiberglass plies 30 of the ply sequences on each side of the flexbeam centerline have varying lengths. For the described embodiment of the flexbeam 10, thirty-two unidirectional fiberglass plies 30 (each of the last sixteen ply sequences 34 adjacent each side of the flexbeam centerline) have endings 30E that terminate in a distributed arrangement 36A in the hub attachment region 12 and the first tapered region 14 to partially define the tapered transition therebetween and the taper of the first tapered region 14.

All of the ±45° graphite cross plies 32 forming the hub attachment region 12, in contrast, have varying lengths. The +45° graphite cross plies 32 adjacent the centerline have the shortest length, and the ±45° graphite cross plies 32 have increasing lengths approaching the outside surfaces of the hub attachment region 12, i.e., the OML. A small number of the ±45° graphite cross plies 32 closest to the flexbeam centerline have endings that terminate in the hub attachment region 12 to partially define the tapered transition between the hub attachment region 12 and the first tapered region 14. The longer length ±45° graphite cross plies 32 have endings 32E that terminate in a distributed arrangement 36B in the first tapered region 14 to partially define the taper of the first tapered region 14 (see FIG. 3A). The longest −45° graphite cross plies 32A (adjacent the upper and lower surfaces of the first tapered region 14, i.e., the OML) have endings 32E that terminate at the juncture between the first tapered region 14 and the second tapered region 16.

The second tapered region 16 is comprised solely of the unidirectional fiberglass plies 30 extending through the first tapered region 14. Starting at the juncture between the first tapered region 14 and the second tapered region 16, selected unidirectional fiberglass plies 30 have endings 30E that terminate in a distributed arrangement 38 in the second tapered region 16 to define the taper thereof, as illustrated in FIG. 3A. For the described embodiment, eighty unidirectional fiberglass plies 30 have endings 30E that terminate in the second tapered region 16 (forty plies 30 on each side of the flexbeam centerline). The thickness of the unidirectional fiberglass plies 30 comprising the second tapered region 16 is sufficient to react the bending loads experienced by the flexbeam 10. Concomitantly, the unidirectional fiberglass plies 30 provide reduced torsional stiffness so that the second tapered region 16 provides a pitch deflection capability in the tapered flexural transition region 24 of the flexbeam 10.

The pitch region 18 is formed by the continuous unidirectional fiberglass plies 30 extending outwardly from the second tapered region 16. For the described embodiment, the pitch region 18 is comprised of sixty-four plies 30 of continuous unidirectional fiberglass. The continuous unidirectional fiberglass plies 30 which form the pitch region 18 define a constant rectangular cross-section over the span thereof that provides reduced torsional stiffness that accommodates high elastic torsional displacements. In addition, the continuous unidirectional plies 30 forming the pitch region 18 provide sufficient strength to transmit centrifugal loads and to prevent torsional buckling of the section.

The continuous unidirectional fiberglass plies 30 comprising the pitch region 18 extend outwardly into the tapered outboard transition region 20 and the BT attachment region 22. Additional unidirectional fiberglass plies 30 of varying lengths and ±45° graphite cross plies 32 of varying lengths are interleaved in combination with the continuous unidirectional fiberglass plies 30 to form the tapered outboard transition region 20 and the BT attachment region 22. As illustrated in FIG. 3B, such a lay-up configuration provides a distributed arrangement 40 of plies 30, 32 having terminated endings 30E, 32E similar to the terminated endings 30E, 32E of the plies 30, 32 forming the hub attachment region 12 and the first tapered region 14.

For the described embodiment of the flexbeam 10, thirty-two plies 30 of unidirectional fiberglass (sixteen plies 30 on each side of the flexbeam centerline) are added to provide a total of ninety-six plies 30 of unidirectional fiberglass (a total of forty-eight plies 30 on each side of the flexbeam centerline) and eighty-eight plies 32 of ±45° graphite (forty-four cross plies 32 on each side of the flexbeam centerline) are added. Starting at the outside surfaces of the BT attachment region 22, i.e., the OML, the cross-sectional ply distribution is similar to that of the hub attachment region 12. That is, repeating ply sequences 34 of two unidirectional fiberglass plies 30, a −45° graphite cross ply 32A, and a +45° graphite cross ply 32B (twenty-two ply sequences 34 on each side of the flexbeam centerline), except at the centerline of the flexbeam 10 wherein eight unidirectional fiberglass plies 30 are layed-up in abutting combination. The ply 30, 32 buildup of the tapered outboard transition region 20 and the BT attachment region 22 is similar to the ply 30, 32 buildup of the hub attachment region 12 and the first tapered region 14, respectively, except for the reduced number of interleaved plies 30, 32 comprising the respective regions 20, 22.

Figure 4A:
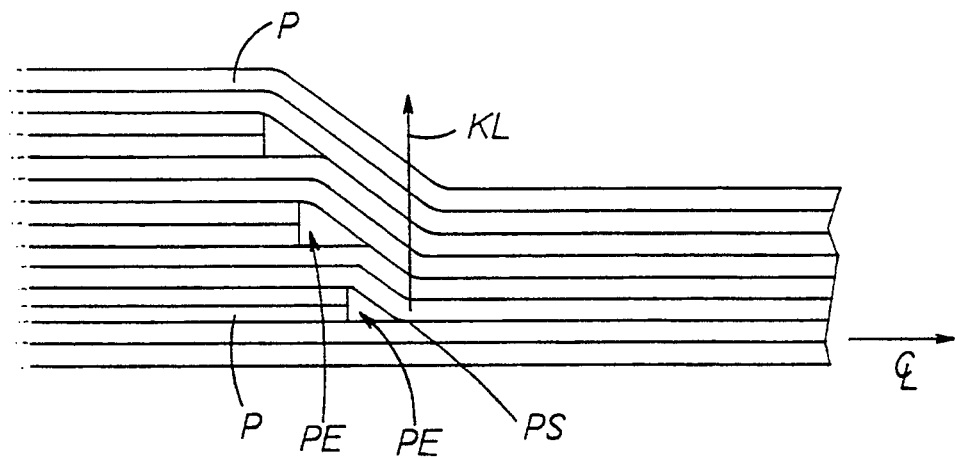
FIG. 4A is a partial cross-sectional view illustrating a conventional ply drop-off arrangement.
Figure 4B:
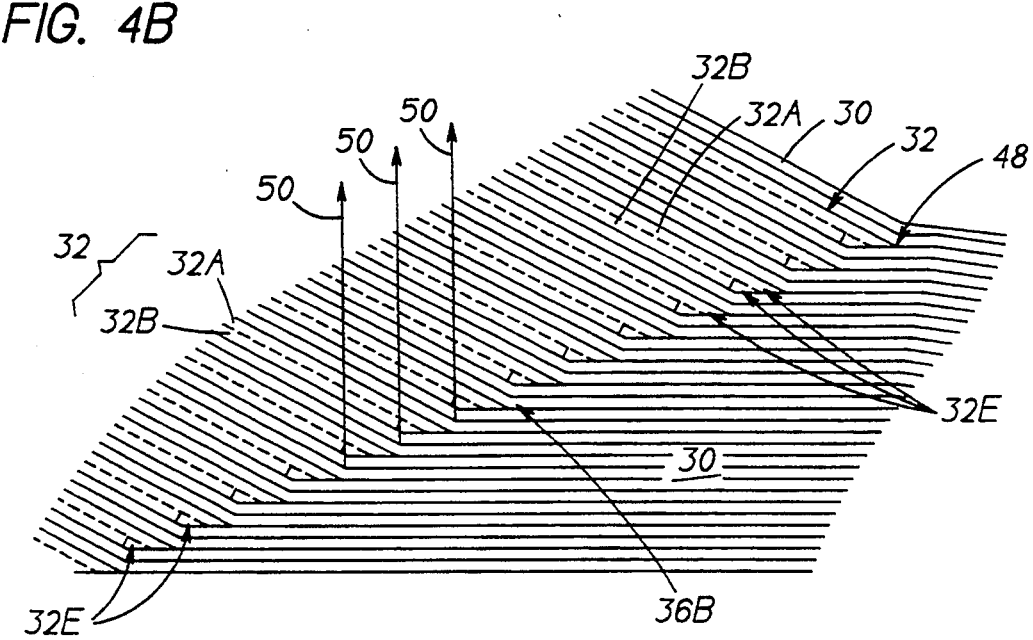
FIG. 4B is a partial cross-sectional view of FIG. 3A illustrating the distributed ply drop-off arrangement of the flexbeam according to the present invention.

As described in the preceding paragraphs, selected plies 30 of unidirectional fiberglass and all of the ±45° graphite cross plies 32 comprising the flexbeam 10 according to the present invention have varying lengths, thereby providing distributed ply drop-off arrangements 36A, 36B, 38, 40, i.e., terminated ply endings 30E, 32E, in the hub attachment region 12, the first tapered region 14, the second tapered region 16, the tapered outboard transition region 20, and the BT attachment region 22, respectively. The unique ply lay-up configuration of the flexbeam 10 according to the present invention results in kick loads being distributed along the ply 30, 32 build-ups comprising the flexbeam 10, rather than summing at a localized line of action, as in conventional ply drop-off arrangements. FIG. 4A illustrates the conventional ply drop-off arrangement in a tapered section and FIG. 4B is an enlarged view of the distributed ply drop-off arrangement 36B of the first tapered region 14 of the flexbeam 10 according to the present invention.

With reference to FIG. 4A, individual composite plies P are layed-up from the mold centerline towards the OML in a conventional ply lay-up technique. Selected plies P have terminated ends PE which form the ply drop-off arrangement illustrated in FIG. 4A. The point PS of highest combined shear (chordwise shear and interlaminar shear due to the ply endings PE), as a result of the arrangement of the terminated ends PE of the layed-up composite plies P, is adjacent the innermost terminated ply endings PE, as illustrated in FIG. 4A. The highest tension stress as a result of the conventional ply lay-up technique is at the innermost composite ply P. The net effect of the conventional ply lay-up technique and the arrangement of terminated ply endings PE is additive vis-a-vis tension stress, which results in an effective kick load KL acting through a single line of action, as illustrated in FIG. 4A. The effect of the kick load KL is to split or separate the individual plies P forming the buildup.

For the flexbeam 10 according to the present invention, in contrast, the individual plies 30, 32 are layed-up from the OML towards the mold centerline. The terminated endings 30E and/or 32E of adjacent plies 30 and/or 32 are disposed to form the respective distributed ply drop-off arrangements 36A, 36B, 38, 40 of the flexbeam 10 according to the present invention. With reference to FIG. 4B, the terminated ending 32E of each respective graphite cross ply 32A extends over the terminated ending 32E of the adjacent graphite cross ply 32B, as illustrated in FIG. 4B. The point of highest bending strain resulting from the ply lay-up configuration and the distributed arrangement 36B of terminated endings 32 according to the present invention is identified in FIG. 4B by reference numeral 48. This results in a non-additive distribution of the kick loads 50 (only three are illustrated) relatively uniformly into the ply buildup 30, 32 comprising the first tapered region 14. In consequence, there is no strength reduction in the ply buildup comprising the first tapered region 14 of the flexbeam 10 according to the present invention as a result of the ply endings 32E, resulting in a stronger first tapered region 14. The other distributed arrangements 36A, 38, 40 described hereinabove provide similar effects for the other regions 12, 16, 20, 22, respectively, of the flexbeam 10.

A variety of modifications and variations of the present invention are possible in light of the above teachings. It is therefore to be understood that, within the scope of the appended claims, the present invention may be practiced otherwise than as specifically described hereinabove.

What is claimed is:

1. A flexbeam for a bearingless main rotor assembly, comprising:
   a hub attachment region formed from a substantially 50/50 admixture of a first plurality of first composite plies and a first plurality of second composite plies layed-up in interleaved combination;
   said first plurality composite plies including first composite plies continuous over the length of said flexbeam and first composite plies having varying lengths, and wherein said first plurality of second composite plies have varying lengths;
   a first tapered region formed by said interleaved combination of said first plurality of first composite plies and said first plurality of second composite plies extending outwardly from said hub attachment region, and wherein substantially all ends of said first plurality of second composite plies terminate in a distributed arrangement in said first tapered region to partially define the taper thereof;
   a second tapered region formed by said first plurality of first composite plies extending outwardly from said first tapered region, and wherein ends of said first composite plies having varying lengths terminate in a distributed arrangement in said second tapered region to define the taper thereof;
   a pitch region formed by said first composite plies continuous over the length of said flexbeam;
   a tapered outboard transition region formed by said first composite plies continuous over the length of said flexbeam, a second plurality of first composite plies having varying lengths, and a second plurality of second composite plies having varying lengths in interleaved combination, said varying lengths of said second pluralities of first and second composite plies defining a distributed arrangement of terminated ends in said tapered outboard transition region to define the taper of said tapered outboard transition region;
   said first composite plies continuous over the length of said flexbeam and said second plurality of first composite plies having varying lengths defining a second plurality of first composite plies; and
   a BT attachment region formed by a substantially 50/50 admixture of said interleaved combination of said second plurality of first composite plies and said second plurality of second composite plies having varying lengths.

2. The flexbeam of claim 1 wherein said first plurality of first composite plies and said second plurality of first composite plies having varying lengths have fiber orientations of 0°, and further wherein said first plurality of second composite plies having varying lengths and said second plurality of second composite plies having varying lengths have fiber orientations of ±45°.

3. The flexbeam of claim 1 wherein said first plurality of first composite plies and said second plurality of first composite plies having varying lengths are formed from a composite material having good ballistic tolerance characteristics, and further wherein said first plurality of second composite plies having varying lengths and said second plurality of second composite plies having varying lengths are formed from a composite material having a high stiffness-to-weight ratio.

4. The flexbeam of claim 1 wherein said first plurality of first composite plies and said second plurality of first composite plies having varying lengths are fiberglass plies having fiber orientations of 0°, and further wherein said firm plurality of second composite plies having varying lengths and said second plurality of second composite plies having varying lengths are graphite plies having fiber orientations of ±45°.

5. The flexbeam of claim 1 wherein selected ones of said first composite plies having varying lengths of said first plurality of first composite plies have ends that terminate in said first tapered region, and wherein ends of said selected first composite plies having varying lengths of said first plurality of first composite plies and said first plurality second composite plies having varying lengths in combination define said distributed arrangement of said first tapered region.

6. The flexbeam of claim 1 wherein selected ones of said first composite plies having varying lengths of said first plurality of first composite plies have ends that terminate in said hub attachment region, and further wherein ends of a number of said first plurality of second composite plies having varying lengths terminate in said hub attachment region, ends of said selected first composite plies varying lengths of said first plurality of first composite plies and said number of said first plurality of second composite plies having varying lengths in combination defining the taper transition between said hub attachment region and said first tapered region.

7. A flexbeam a bearingless main rotor assembly, comprising:
 a plurality of continuous first composite plies extending the length of said flexbeam;
 a first plurality of first composite plies having varying lengths;
 a second plurality of first composite plies having varying lengths;
 a first plurality of second composite plies having varying lengths; and
 a second plurality of second composite plies having varying lengths;
 said plurality of continuous first composite plies, said first plurality of first composite plies, and said first plurality of second composite plies in interleaved combination forming a hub attachment region of said flexbeam;
 said interleaved combination of said continuous first composite plies, said first plurality of first composite plies, and said first plurality of second composite plies extending outwardly from said hub attachment region forming a first tapered region of said flexbeam, substantially all ends of said first plurality of second composite plies terminating in a distributed arrangement in said first tapered region to define the taper thereof;
 said continuous first composite plies and said first plurality of first composite plies extending outwardly from said first tapered region forming a second tapered region of said flexbeam, ends of said first plurality of first composite plies terminating in a distributed arrangement in said second tapered region to define the taper thereof:
 said continuous first composite plies extending outwardly from said second tapered region forming a pitch region having a constant rectangular cross section of said flexbeam;
 said continuous first composite plies, said second plurality of first composite plies, and said second plurality of second composite plies in interleaved combination defining a tapered outboard transition region of said flexbeam, ends of said second pluralities of first and second composite plies in combination terminating in a distributed arrangement in said tapered outboard transition region that defines the taper of said tapered outboard transition region;
 said interleaved combination of said continuous first composite plies, said second plurality of first composite plies, and said second plurality of second composite plies extending outwardly from said tapered outboard transition region forming a BT attachment region of said flexbeam.

8. The flexbeam of claim 7 wherein said plurality of continuous first composite plies and said first and second pluralities of first composite plies have fiber orientations of 0°, and further wherein said first and second pluralities of second composite plies have fiber orientations of ±45°.

9. The flexbeam of claim 7 wherein said plurality of continuous first composite plies and said first and second pluralities of first composite plies are formed from a composite material having good ballistic tolerance characteristics, and further wherein said first and second pluralities of second composite plies are formed from a composite material having a high stiffness-to-weight ratio.

10. The flexbeam of claim 7 wherein said plurality of continuous first composite plies and said first and second pluralities of first composite plies are fiberglass plies having fiber orientations of 0°, and further wherein said first and second pluralities of second composite plies are graphite plies having fiber orientations of ±45°.

11. The flexbeam of claim 7 wherein said plurality of continuous first composite plies and said first plurality of first composite plies having varying lengths define a plurality of first composite plies and wherein said interleaved combination forming said hub attachment region comprises a substantially 50/50 admixture of said plurality of first composite plies and said first plurality of second composite plies.

12. The flexbeam of claim 7 wherein said plurality of continuous first composite plies and said second plurality of first composite plies having varying lengths define a plurality of first composite plies and wherein said interleaved combination forming said BT attachment region comprises a substantially 50/50 admixture of said plurality of first composite plies and said second plurality of second composite plies.

13. A flexbeam for a bearingless main rotor assembly, comprising:
 a plurality of continuous unidirectional fiberglass plies having fiber orientations of 0° and extending the length of said flexbeam;
 a first plurality of unidirectional fiberglass plies having fiber orientations of 0°, said first plurality of unidirectional fiberglass plies having varying lengths;
 a second plurality of unidirectional fiberglass plies having fiber orientations of 0°, said second plurality of unidirectional fiberglass plies having varying lengths;

a first plurality of graphite cross plies having fiber orientations of ±45°, said first plurality of graphite cross plies having varying lengths; and a second plurality of graphite cross plies having fiber orientations of ±45°, said second plurality of graphite cross plies having varying lengths;

said plurality of continuous unidirectional fiberglass plies, said first plurality of unidirectional fiberglass plies, and said first plurality of graphite cross plies in interleaved combination forming a hub attachment region of said flexbeam;

said interleaved combination of said plurality of continuous unidirectional fiberglass plies, said first plurality of unidirectional fiberglass plies, and said first plurality of graphite cross plies extending outwardly from said hub attachment region timing a first tapered region of said flexbeam, substantially all ends of said first plurality of graphite cross plies terminating in a distributed arrangement in said first tapered region to define the taper thereof;

said continuums unidirectional fiberglass plies and said first plurality of unidirectional fiberglass plies extending outwardly from said first tapered region forming a second tapered region of said flexbeam, ends of said first plurality of unidirectional fiberglass plies terminating in a distributed arrangement in said second tapered region to define the taper thereof;

said continuous unidirectional fiberglass plies extending outwardly from said second tapered region forming a pitch region having a constant rectangular cross section of said flexbeam;

said continuous unidirectional fiberglass plies, said second plurality of unidirectional fiberglass plies, and said second plurality of graphite cross plies in interleaved combination forming a tapered outboard transition region of said flexbeam, ends of said second plurality of unidirectional fiberglass plies and said second plurality of graphite cross plies in combination defining a distributed arrangement that defines the taper of said tapered outboard transition region;

said interleaved combination of said continuous unidirectional fiberglass plies, said second plurality of unidirectional fiberglass plies, and said second plurality of graphite cross plies extending outwardly from said tapered outboard transition region forming a BF attachment region of said flexbeam.

14. The flexbeam of claim 13 wherein said plurality of continuous unidirectional fiberglass plies and said first plurality of unidirectional fiberglass plies define a plurality of unidirectional fiberglass plies and wherein said interleaved combination forming said hub attachment region comprises a substantially 50/50 admixture of said plurality of unidirectional fiberglass plies and said first plurality of graphite cross plies.

15. The flexbeam of claim 13 wherein said plurality of continuous unidirectional fiberglass plies and said second plurality of unidirectional fiberglass plies having varying lengths define a plurality of unidirectional fiberglass plies and wherein said interleaved combination forming said BT attachment region comprises a substantially 50/50 admixture of said plurality of unidirectional fiberglass plies and said second plurality of graphite cross plies.

16. A flexbeam for a bearingless main rotor assembly that includes a main rotor hub assembly, comprising:

hub attachment region means for connecting said flexbeam in combination with the main rotor hub assembly;

blade, torque tube attachment region means for connecting said flexbeam in combination with a main rotor blade of the bearingless main rotor assembly;

pitch region means for accommodating torsional displacements of the main rotor blade; and at least one tapered region intermediate said hub attachment region means and said pitch region means, said at least one tapered region including a plurality of continuous composite plies extending form said hub attachment region means through said pitch region means to said blade, torque tube attachment region means and a plurality of composite plies of varying lengths extending from said hub attachment region means into said at least one tapered region;

plies of said plurality of continuous composite plies and said plurality of composite plies of varying lengths being layed-up in interleaved combination to form said at least one tapered region;

ends of said plurality of composite plies of varying lengths forming a distributed ply drop-off arrangement in said at least one tapered region to provide a non-additive distribution of kick-loads in said at least one tapered region.

17. The flexbeam of claim 16 wherein said plurality of continuous composite plies are unidirectional plies having a 0° fiber orientation and said plurality of composite plies having varying lengths are unidirectional plies having a 0° fiber orientation.

18. The flexbeam of claim 16 wherein said plurality of continuous composite plies are unidirectional plies having a 0° fiber orientation and said plurality of composite plies having varying lengths are cross plies having a ±45° fiber orientation.

19. The flexbeam of claim 16 further comprising another tapered region intermediate said pitch region means and said blade, torque tube attachment region means, said another tapered region including said plurality of continuous composite plies extending from said hub attachment region means through said pitch region means to said blade, torque tube attachment region means and a plurality of composite plies of varying lengths extending from said another tapered region to said blade, torque tube attachment region means;

plies of said plurality of continuous composite plies and said plurality of composite plies of varying lengths being layed-up in interleaved combination to form said another tapered region;

ends of said plurality of composite plies of varying lengths forming a distributed ply drop-off arrangement in said another tapered region to provide a non-additive distribution of kick-toads in said another tapered region.

20. The flexbeam of claim 19 wherein said plurality of continuous composite plies are unidirectional plies having a 0° fiber orientation and said plurality of composite plies having varying lengths are cross plies having a ±45° fiber orientation.

* * * * *